United States Patent
Wu et al.

(10) Patent No.: US 12,363,730 B2
(45) Date of Patent: Jul. 15, 2025

(54) SCHEDULING REQUEST AND RANDOM ACCESS TRIGGERING FOR SDT

(71) Applicant: Nokia Technologies Oy, Espoo (FI)

(72) Inventors: Chunli Wu, Beijing (CN); Samuli Heikki Turtinen, Ii (FI); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 345 days.

(21) Appl. No.: 18/048,929

(22) Filed: Oct. 24, 2022

(65) Prior Publication Data

US 2023/0140332 A1 May 4, 2023

(30) Foreign Application Priority Data

Oct. 29, 2021 (WO) ................ PCT/CN2021/127514

(51) Int. Cl.
*H04W 72/23* (2023.01)
*H04W 28/02* (2009.01)
(Continued)

(52) U.S. Cl.
CPC ....... *H04W 72/23* (2023.01); *H04W 28/0278* (2013.01); *H04W 56/001* (2013.01); *H04W 74/0833* (2013.01)

(58) Field of Classification Search
CPC ............. H04W 72/23; H04W 28/0278; H04W 56/001; H04W 74/0833; H04W 72/21;
(Continued)

(56) References Cited

U.S. PATENT DOCUMENTS

2021/0037530 A1 2/2021 Shih et al.
2021/0105688 A1 4/2021 Paladugu et al.
(Continued)

FOREIGN PATENT DOCUMENTS

CN 110741713 A 1/2020
CN 113455052 A 9/2021
(Continued)

OTHER PUBLICATIONS

Examiner's Preliminary Examination Opinion and Advising received for corresponding Taiwan Patent Application No. 111140440, dated Jun. 13, 2023, 16 pages of Examiner's Preliminary Examination Opinion and 5 pages of translation available.
(Continued)

*Primary Examiner* — Kyaw Z Soe
(74) *Attorney, Agent, or Firm* — ALSTON & BIRD LLP

(57) ABSTRACT

Example embodiments of the present disclosure relate to a device, method, apparatus and computer readable storage medium of scheduling request (SR) and random access (RA) triggering for small data transmission (SDT). In example embodiments, a terminal device receives, from a network device, a configuration of one or more configured grant (CG) resources for a SDT procedure and a list of one or more data radio bearers (DRBs) associated with respective logical channels (LCHs) allowed for SDT over at least one of the one or more CG resources. After the terminal device initiates the SDT procedure in an inactive mode, if the terminal determines that a buffer status report (BSR) is triggered, the terminal device determines whether a configuration of a SR mask is to be applied for a LCH configured for SDT.

20 Claims, 4 Drawing Sheets

(51) Int. Cl.
*H04W 56/00* (2009.01)
*H04W 74/0833* (2024.01)

(58) Field of Classification Search
CPC .... H04W 72/115; H04W 56/0045; H04W 76/27
See application file for complete search history.

(56) References Cited

U.S. PATENT DOCUMENTS

| | | | |
|---|---|---|---|
| 2021/0211947 A1 | 7/2021 | Agiwal et al. | |
| 2021/0337625 A1 | 10/2021 | Tsai et al. | |
| 2022/0279557 A1 | 9/2022 | Li et al. | |
| 2023/0171835 A1* | 6/2023 | Fang | H04W 72/046 370/329 |
| 2024/0023192 A1* | 1/2024 | Loehr | H04W 76/27 |

FOREIGN PATENT DOCUMENTS

| | | |
|---|---|---|
| EP | 3986071 A1 | 4/2022 |
| EP | 4233377 A1 | 8/2023 |
| TW | 202126085 A | 7/2021 |
| TW | 202130207 A | 8/2021 |
| WO | 2021/136474 A1 | 7/2021 |
| WO | 2021/213505 A1 | 10/2021 |
| WO | WO 2021/207317 A1 | 10/2021 |
| WO | WO 2022/082507 A1 | 4/2022 |
| WO | WO 2022/204919 A1 | 10/2022 |
| WO | WO 2023/010466 A1 | 2/2023 |

OTHER PUBLICATIONS

"The issues on user plane common aspects for SDT", 3GPP TSG-RAN WG2 #115-e, R2-2107847, Agenda: 8.6.2, ZTE, Aug. 16- 27, 2021, pp. 1-12.
Office Action received for corresponding Taiwan Patent Application No. 111140440, dated Jan. 25, 2024, 9 pages of Office Action and 1 page of translation available.
Notice of Allowance for Taiwanese Application No. 111140440 dated Nov. 6, 2024, 4 pages.
Extended European Search Report for European Application No. 24202052.7 dated Jan. 24, 2025, 9 pages.
Extended European Search Report received for corresponding European Patent Application No. 22202640.3, dated Mar. 15, 2023, 10 pages.
"Summary of [Post115-e][509][SDT] CG open issues (Xiaomi)", 3GPP TSG-RAN WG2 #116-e, R2-2110670, Agenda: 8.6.5, Xiaomi Communications, Nov. 1-12, 2021, 40 pages.
CATT, "Consideration on UP common aspects of SDT", 3GPP TSG-RAN WG2 #114-e, R2-2105280, (May 19-May 27, 2021), 7 pages.
Huawei et al, "Small data transmission with CG-based scheme", 3GPP TSG-RAN WG2 Meeting #116-e, R2-2110183, (Nov. 1-12, 2021), 10 pages.
Google Inc, "Discussion on beam operations for small data transmission", 3GPP TSG-RAN WG2 Meeting #113bis-e, R2-2103674, (Apr. 12-20, 2021), 2 pages.
Nokia et al., "Introduction of SDT", 3GPP TSG-RAN WG2 Meeting #116-e, R2-2110808, (Nov. 1-12, 2021), 17 pages.
OPPO, Report of [AT115e][502][Sdata] Summary of RA aspects, 3GPP TSG-RAN2 #115e, R2-2108916, (Aug. 16-27, 2021), 35 pages.

Ericsson, "Details of CG based SDT", 3GPP TSG-RAN WG2 #116-e, R2-2109592, (Nov. 1-12, 2021), 7 pages.
Qualcomm Incorporated, "Remaining issues on CG based SDT", 3GPP TSG-RAN2 Meeting #116-e, R2-2110761, (Nov. 1-12, 2021), 6 pages.
Apple, "CG specific SDT procedure", 3GPP TSG-RAN WG2 Meeting #116e, R2-2110034, (Nov. 1-12, 2021), 6 pages.
Intel Corporation, "CG-SDT leftover Issues", 3GPP TSG RAN WG2 Meeting #116-e, R2-2109623, (Nov. 2021), 6 pages.
Nokia et al., "Aspects specific to CG-SDT", 3GPP TSG-RAN WG2 Meeting #116e, R2-2111031, (Nov. 1-12, 2021), 3 pages.
China Telecom, "Discussion on open issues for CG based SDT", 3GPP TSG-RAN WG2 Meeting #116e, R2-2110961, (Nov. 1-16, 2021), 4 pages.
Vivo, "Supporting small data transmission via CG PUSCH", 3GPP TSG-RAN WG2 Meeting #116-e, R2-2109441, (Nov. 1-12, 2021), 3 pages.
"Work Item on NR smalldata transmissions in INACTIVE state", 3GPP TSG RAN Meeting #86, RP-193252, Agenda: 9.1.2, ZTE Corporation, Dec. 9-12, 2019, 4 pages.
"3rd Generation Partnership Project; Technical Specification Group Radio Access Network; NR; Medium Access Control (MAC) protocol specification (Release 16)", 3GPP TS 38.321, V16.6.0, Sep. 2021, pp. 1-158.
"3rd Generation Partnership Project; Technical Specification Group Radio Access Network; NR; Radio Resource Control (RRC) protocol specification (Release 16)", 3GPP TS 38.331, V16.6.0, Sep. 2021, pp. 1-961.
International Search Report and Written Opinion received for corresponding Patent Cooperation Treaty Application No. PCT/CN2021/127514, dated Apr. 26, 2022, 10 pages.
"Common aspects between CG and RACH", 3GPP TSG-RAN2 Meeting #113-e, R2-2101162, Agenda: 8.6.1, ZTE Corporation, Jan. 25-Feb. 5, 2021, 25 pages.
"The issues on user plane common aspects for SDT", 3GPP TSG-RAN WG2 #115-e, R2-2107487, Agenda: 8.6.2, ZTE, Aug. 16-27,2021, 12 pages.
"Discussion on RACH based SDT", 3GPP TSG-RAN WG3 #114-e, R3-214845, Agenda: 24.2, ZTE, Nov. 1-11, 2021, 26 pages.
Extended European Search Report for European Application No. 21961901.2 dated Nov. 29, 2024, 13 pages.
Huawei et al., "Running MAC CR for Small Data", 3GPP TSG-RAN2 Meeting #116e, R2-2110185, (Nov. 1-12, 2021), 72 pages.
ZTE, "Discussion on CG based SDT", 3GPP TSG-RAN WG3 #114-e, R3-214846, (Nov. 1-11, 2021), 29 pages.
Decision to Grant for Japanese Application No. 2024-524382 dated Mar. 17, 2025, 4 pages.
Examination Report for Australian Application No. 2021470963 dated Mar. 31, 2025, 2 pages.
LG Electronics, "Remaining UP issues in SDT", 3GPP TSG-RAN2 #116e, R2-2111124, (Nov. 1-12, 2021), 5 pages.
Oppo, "Discussion on user plane issues of SDT", 3GPP TSG-RAN WG2 Meeting #116 electronic, R2-2109768, (Nov. 1-12, 2021), 5 pages.
LG Electronics Inc., "Remaining issues in RRM relaxation for stationary RedCap UEs", BGPP TSG-RAN W62 Meeting #115-e, R2-2107847, (Aug. 16-27, 2021), 4 pages.
Notice of Acceptance for Australian Application No. 2021470963 dated Apr. 27, 2025, 3 pages.
Notice of Allowance for Taiwanese Application No. 114104143 dated Mar. 28, 2025, 4 pages.
Office Action for Vietnamese Application No. 1-2024-03631 dated Feb. 28, 2025, 2 pages.

* cited by examiner

SCHEDULING REQUEST AND RANDOM ACCESS TRIGGERING FOR SDT

RELATED APPLICATION

This application was originally filed as PCT Application No. PCT/CN2021/127514, filed on Oct. 29, 2021, which is incorporated herein by reference in its entirety.

FIELD

Example embodiments of the present disclosure generally relate to the field of communications, and in particular, to a device, method, apparatus and computer readable storage medium of scheduling request (SR) and random access (RA) triggering for Small Data Transmission (SDT).

BACKGROUND

User equipment (UE) in an inactive state can perform SDT to reduce signaling overhead and delay due to transition from the inactive state to a connected state. Two typical types of SDT include Random Access Channel (RACH) based SDT (RACH-based SDT) and Configured Grant based SDT (CG-SDT). For CG-SDT, one or more CG resources may be configured either an initial bandwidth part (BWP) or a separate SDT BWP. If none of Reference Signal Receiving Power (RSRP) of synchronization signal blocks (SSBs) associated with the CG resources is above a RSRP threshold of the CG-SDT criteria in the selection phase for the SDT type, the UE may select RA-SDT if the RA-SDT criteria are met.

During the SDT procedure, a Scheduling Request (SR) may be triggered due to lack of UL resources. If no SR resource is configured for SDT, when a Buffer Status Report (BSR) is triggered by SDT data, the UE may trigger random access (RA) because the SR resource is not available. The SR and RA trigger may induce unnecessary BWP switching.

SUMMARY

In general, example embodiments of the present disclosure provide a device, method, apparatus and computer readable storage medium of SR and RA triggering for SDT.

In a first aspect, a terminal device is provided which comprises at least one processor and at least one memory including computer program code. The at least one memory and the computer program code are configured to, with the at least one processor, cause the terminal device to receive, from a network device, a configuration of one or more configured grant (CG) resources for a small data transmission (SDT) procedure and a list of one or more data radio bearers (DRBs) associated with respective logical channels (LCHs) allowed for SDT over at least one of the one or more CG resources. The terminal device is further caused to initiate the SDT procedure in an inactive mode and in accordance with a determination that a buffer status report (BSR) is triggered, determine whether a configuration of a scheduling request mask is to be applied for a LCH configured for SDT.

In a second aspect, a terminal device is provided which comprises at least one processor and at least one memory including computer program code. The at least one memory and the computer program code are configured to, with the at least one processor, cause the terminal device to receive, from a network device, a configuration of one or more CG resources for a SDT procedure and a list of one or more DRBs associated with respective LCHs allowed for SDT over at least one of the one or more CG resources. The terminal device is further caused to in response to determining that a random access procedure is to be initiated, determining whether an initiation of the random access procedure is to be delayed.

In a third aspect, a method is provided. In the method, a terminal device receives, from a network device, a configuration of one or more CG resources for a SDT procedure and a list of one or more DRBs associated with respective LCHs allowed for SDT over at least one of the one or more CG resources. After the terminal device initiates the SDT procedure in an inactive mode, if the terminal determines that a BSR is triggered, the terminal device determines whether a configuration of a scheduling request mask is to be applied for a LCH configured for SDT.

In a fourth aspect, a method is provided. In the method, a terminal device receives, from a network device, a configuration of one or more CG resources for a SDT procedure and a list of one or more DRBs associated with respective LCHs allowed for SDT over at least one of the one or more CG resources. If the terminal device determines that a random access procedure is to be initiated, the terminal device determines whether an initiation of the random access procedure is to be delayed.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
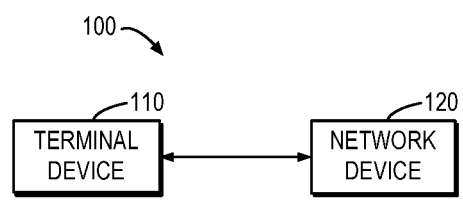
FIG. 1 illustrates an example environment in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

For RA-SDT, in 3rd Generation Partnership Project (3GPP) Release 17 (REL17), uplink (UL) small data transmissions for RACH-based schemes (including 2-step and 4-step RACH) are used to enable User-Plane (UP) data transmission for small data packets from an INACTIVE state, for example, using message A (MSGA) or message 3 (MSG3). Flexible payload sizes are provided to be larger than a common control channel (CCCH) message size in Release 16 (Rel-16) that is currently possible in the INACTIVE state for MSGA and MSG3 to support UP data transmission in UL. The actual payload size may depend from network (NW) configuration. Context fetch and data forwarding (with and without anchor relocation) in the INACTIVE state are supported for the RACH-based SDT. Contention Free Random Access (CFRA) is not supported for RA-SDT. The separate search space is common to the UEs performing RA-SDT.

For CG-SDT, transmission of UL data on pre-configured PUSCH resources by reusing the configured grant type 1 is allowed when timing advance (TA) is valid, to provide small data transmission over the configured grant type 1 resources in the INACTIVE state. The configured grant type 1 resources are configured for small data transmission in UL for the INACTIVE state. The UE-specific search space may be configured for UEs performing CG-SDT. The UE may need to monitor paging after the UE initiates SDT for system information change. The CG-SDT resources can be configured on either an initial BWP or a separate SDT BWP. If none of Reference Signal Receiving Power (RSRP) of synchronization signal blocks (SSBs) is above a RSRP threshold of the CG-SDT criteria in the selection phase of the SDT type, the UE may select RA-SDT if RA-SDT criteria are met.

The UE may release CG-SDT resources (if stored) when the UE initiates a Radio Resource Control (RRC) resume procedure from another cell which is different from the cell in which RRCRelease is received. Cell Radio Network Temporary Identifier (C-RNTI) previously configured in the RRC_CONNECTED state may be used for the UE to monitor a Physical Downlink Control Channel (PDCCH) in CG-SDT. Configured Scheduling-RNTI (CS-RNTI) based dynamic retransmission mechanism can be reused for CG-SDT. It is for further study whether the CS-RNTI is the same as the one previously configured in RRC_CONNECTED or a new CS-RNTI is provided to the UE.

For the purpose of CG resource selection, the UE may re-evaluate SSBs for subsequent CG transmission. It is for further study what happens if no SSBs are valid or if no sample of candidate beam detection is available. Some parameters may be included in the CG-SDT configuration which may include a new TA timer in RRC_INACTIVE, a RSRP change threshold for a TA validation mechanism in SDT, and/or a SSB RSRP threshold for beam selection (where the UE selects the beam and associated CG resources for data transmission). It is for further study whether these parameters are common for multiple CG-SDT configurations or per CG-SDT configuration.

During a SDT procedure, the UE may perform Packet Data Convergence Protocol (PDCP) re-establishment implicitly without an explicit indication for the PDCP re-establishment. It may be explicitly configured by the network whether to support Robust Header Compression (ROHC) continuity. PDCP duplication and connected mode Discontinuous Reception (DRX) may not be supported while the Power Headroom Report (PHR) functionality may be supported for SDT.

Scheduling Request (SR) resources may not be configured for SDT. In this case, when a Buffer Status Report (BSR) is triggered by SDT data, the UE may trigger random access (RA) because the SR resource is not available. For example, during the CG transmission phase, after the UE has received a response from the NW, the UE may trigger a legacy RACH procedure due to no UL resources. Media Access Control (MAC) Protocol Data Unit (PDU) rebuilding may be not required. It is for further study whether the RA-SDT RA resources can be used for subsequent data.

As an example, if there is no qualified SSB when SSB evaluation is performed, when TA is invalid, and/or when SR is triggered due to lack of UL resource, the UE may initiate a RACH procedure. If the CG-SDT resource is configured on a dedicated BWP and there is no RA resource configured on the dedicated BWP, the UE may need to switch to an initial BWP to perform a RACH procedure.

For example, upon initiation of the RA procedure on a Serving Cell, after selecting a carrier for the RA procedure, for the selected carrier of this Serving Cell, the MAC entity of the UE may switch an active UL BWP to a BWP indicated by initialUplinkBWP if PRACH occasions are not configured for the active UL BWP. If the Serving Cell is a special cell (SpCell), the MAC entity may switch an active DL BWP to BWP indicated by initialDownlinkBWP. In the case that PRACH occasions are configured for the active UL BWP, when the Serving Cell is a special cell (SpCell), if the active DL BWP does not have the same bwp-Id as the active UL BWP, the MAC entity may switch the active DL BWP to the DL BWP with the same bwp-Id as the active UL BWP. The MAC entity may stop the bwp-InactivityTimer associated with the active DL BWP of this Serving Cell, if running. If the Serving Cell is a secondary cell (SCell), the MAC entity may stop the bwp-InactivityTimer associated with the active DL BWP of SpCell, if running. The MAC entity may perform the RA procedure on the active DL BWP of SpCell and active UL BWP of this Serving Cell.

In addition, a CONNECTED-mode UE with a configured grant may trigger a SR if a SR mask is not configured for a logical channel (LCH) which triggered a regular BSR. It may not be an issue for the CONNECTED mode since in case mask is not configured a dedicated SR is usually configured for the CONNECTED mode. However, it may not be applicable in the INACTIVE mode during the SDT procedure. If the SR is triggered in case the SR mask is set to false in the INACTIVE mode, an unnecessary RA procedure and further BWP switching may be caused during the CG-SDT procedure even though the CG-SDT resources are still available.

Example embodiments of the present disclosure provide SR and RA triggering enhancement schemes for SDT to avoid unnecessary SR and/or RA triggering to avoid unnecessary BWP switching. In one aspect, for the SR triggering enhancement, a terminal device (such as a UE) capable of CG-SDT receives a configuration of one or more configured grant (CG) resources for a SDT procedure from a network device (such as a base station) and a list of data radio bearers (DRBs) associated with respective logical channels (LCHs) allowed for SDT over at least one of the one or more CG resources. After the terminal device in an inactive mode, such as a RRC_INACTIVE mode, initiates the SDT procedure, the terminal device determines whether a LCH that triggered a buffer status report (BSR) is allowed for SDT over the at least one of the one or more CG resources. If the LCH is allowed for SDT, the terminal device determines whether a configuration of a scheduling request (SR) mask is to be applied for the LCH.

In some example embodiments, if the terminal device determines that at least one of the CG resources is valid, the terminal device determines that the configuration of the SR mask is not to be applied for the LCH. Accordingly, the terminal device may bypass the SR mask. Alternatively, if the SR mask is set to be false in a connected mode, such as a RRC_CONNECTED mode, the terminal device may set the SR mask to be true. Thus, unnecessary SR triggering may be prevented during a SDT procedure.

In another aspect, for the RA triggering enhancement, the terminal device capable of CG-SDT delays an initiation of a RA procedure when the terminal devices determines that the RA procedure is needed. As such, unnecessary RA triggering may also be prevented In this way, unnecessary SR and RA triggering may be prevented, thereby saving power consumption and reducing signaling overhead and improving system efficiency.

FIG. 1 shows an example environment 100 in which example embodiments of the present disclosure can be implemented.

The environment 100, which may be a part of a communication network, comprises a terminal device 110 and a network device 120 that can communicate with each other. It is to be understood that two devices are shown in the environment 100 only for the purpose of illustration, without suggesting any limitation to the scope of the present disclosure. Any suitable numbers of terminal devices and network devices may be included in the environment 100.

The terminal device 110 can communicate with the network device 120 or with other terminal devices directly or via the network device 120. The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

The terminal device 110 can receive, from the network device 120, a configuration of one or more CG resources for a SDT procedure in an inactive state or mode (such as RRC_INACTIVE). The terminal device 110 further receives from the network device 120 a list of DRBs associated with respective LCHs allowed for SDT over at least one of the one or more CG resources. In various example embodiments, the terminal device 110 tries to avoid unnecessary SR and/or RA triggering to save the power consumption and improve the system efficiency.

Some example embodiments for SR triggering enhancement will be discussed below with reference to FIG. 2.

Figure 2:
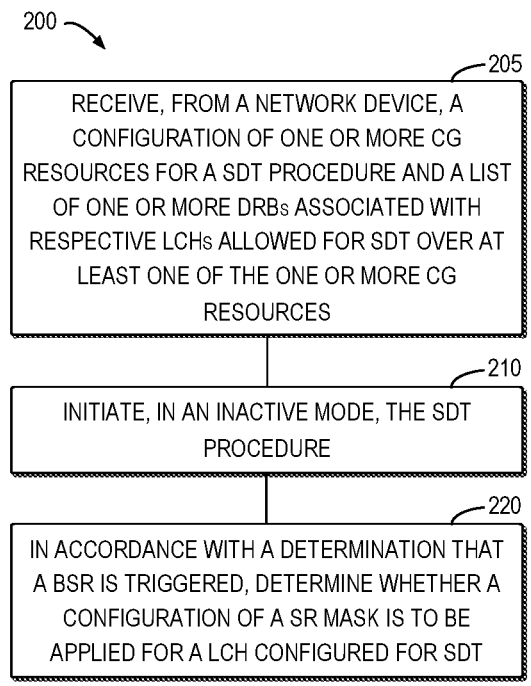
FIG. 2 illustrates a flowchart of an example method for scheduling request (SR) trigging enhancement according to some example embodiments of the present disclosure.

FIG. 2 shows a flowchart of an example method 200 for SR triggering enhancement at the terminal device 110 according to some example embodiments of the present disclosure.

As shown in FIG. 2, at block 205, the terminal device 110 receives, from the network device 120, a configuration of one or more CG resources for a SDT procedure and a list of DRBs associated with respective LCHs allowed for SDT over at least one of the one or more CG resources. The configuration of the one or more CG resources may be used by the terminal device 110 in an inactive mode to initiate a connection resume attempt for the SDT. The CG resources may be configured on a dedicated BWP or an initial BWP.

At block 210, the terminal device 110 initiates the SDT procedure. At block 215, if the terminal device 110 determines that a BSR is triggered, the terminal device 110 determines whether a configuration of a SR mask is to be applied for a LCH configured for SDT.

For example, in some example embodiments, when the terminal device 110 is in the CONNECTED mode, the terminal device 110 may receive from the network device 120 a configuration of a SR mask for a LCH or a DRB associated with the LCH for SDT. The SR mask (or SR-mask) can be set to be true or false. Conventionally, during the SDT procedure in an active mode, in case SR-mask=true, no SR will be triggered, and in case SR-mask=false, a SR will be triggered. The SR-mask configuration stored from the CONNECTED mode may continue to be used in the INACTIVE mode. If SR-mask is not stored from the CONNECTED mode, the default value of SR-mask is false. Accordingly, SR-mask=false will cause a SR triggered and then cause an unnecessary RA triggered during the CG-SDT procedure even though at least one of the CG-SDT resources are still usable.

According to some example embodiments of the present disclosure, the terminal device 110 may determine whether or not to apply the SR mask based on whether a LCT triggered the BSR is allowed for SDT over at least one of the one or more CG resources. If the LCH is allowed, the terminal device 110 may determine that the configuration of the SR mask will not be applied or alternatively consider it as set to true. Otherwise, if the LCH is disallowed, the terminal device 110 may determine that the SR mask will be applied or alternatively consider it as set to false. In other words, regardless of the SR mask configuration stored for the LCHs, during SDT procedure, BSR triggered by a LCH that is allowed for SDT over at least one of the one or more CG resources will not trigger SR, while BSR triggered by a LCH that is not allowed for SDT over at least one of the one or more CG resources will trigger SR. The triggered SR then results in RA procedure since there is no dedicated SR resource available during SDT in INACTIVE mode. For example, if the terminal device 110 determines that at least one of the one or more CG resources is valid, the terminal device 110 determines that the configuration of the SR mask is not to be applied. For example, the terminal device 110 may not consider the SR-mask configuration to bypass the SR mask. Thus, even if a SR mask for a LCH is configured and stored to be false in the CONNCECTED mode, the terminal device 110 will not trigger the SR.

In some example embodiments, the SR masks used in the CONNCECTED mode and the INACTIVE mode may be different without explicit reconfiguration. For example, the terminal device 110 may set the SR mask to be true for a LCH or data bearer for the SDT procedure regardless of the SR mask configuration stored in the CONNCECTED mode.

In some example embodiments, if the LCH triggered a BSR is allowed over at least one of the CG-SDT resources, the SR will not be triggered as long as there is a valid SSB for CG-SDT without considering the SR mask configuration. Alternatively or in addition, if the CG-SDT resource associated with the LCH triggered the BSR is not valid (for example, there is no valid SSB associated with the available CG-SDT resource), the SR will not be triggered unless there is no valid CG-SDT resource at all.

As such, during the SDT procedure, unnecessary SR triggering may be avoided, and therefore the power consumption may be saved at the terminal device 110. Moreover, the signaling overhead may be reduced, and the system efficiency may be improved.

As discussed above, during the CG-SDT procedure, a RA procedure may be initiated if there is no qualified SSB when SSB evaluation is performed, when TA is invalid, and/or when the SR is triggered due to lack of UL resources. According to some example embodiments of the present disclosure, the terminal device 110 delays the initiation of the RA procedure to reduce the resource consumption and increase the resource utilization and further to improve the system efficiency.

Some example embodiments for RA triggering enhancement will be discussed below with reference to FIG. 3.

Figure 3:
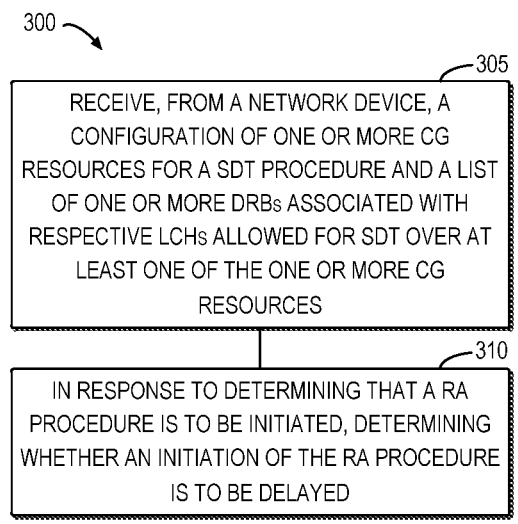
FIG. 3 illustrates a flowchart of an example method for random access (RA) trigging enhancement according to some other example embodiments of the present disclosure.

FIG. 3 shows a flowchart of an example method 300 for RA triggering enhancement at the terminal device 110 according to some example embodiments of the present disclosure.

As shown in FIG. 3, at block 305, the terminal device 110 receives, from the network device 120, a configuration of one or more CG resources for a SDT procedure and a list of DRBs associated with respective LCHs allowed for SDT over at least one of the one or more CG resources, similar to block 205 as shown in FIG. 2. Then, at block 310, if the terminal device 110 determines that a RA procedure is to be initiated, the terminal device 110 determines whether an initiation of a RA procedure is to be delayed. For example, if there is no qualified SSB when SSB evaluation is performed, when TA is invalid, and/or when the SR is triggered due to lack of UL resources, the terminal device 110 determines that a RA procedure is to be initiated. In this situation, the terminal device 110 will determine whether or not to delay the RA procedure.

In some example embodiments, if there is no qualified SSB when the SSB evaluation is performed, the terminal device 110 may determine to delay the RA triggering to avoid triggering beam or radio link failure recovery immediately. This is because a beam failure or radio link failure may be recovered soon if there was some sudden (and short lasting) obstacle or fade. In this case, the delay may avoid unnecessary RA triggering, thereby reducing the power consumption, reducing network capacity, and improving the system efficiency.

In some example embodiments, the RA procedure may be delayed or distinguished depending on whether the CG-SDT resource or the ongoing SDT procedure is on a dedicated BWP with no RACH configuration. For example, the delay may be applied if the CG-SDT resource is configured on a dedicated BWP. If the CG-SDT is to be performed on the initial BWP, the terminal device 110 may determine that the RA procedure will not be delayed, but triggered immediately. The RA triggering upon no valid SSB for CG-SDT may be delayed with a timer (or counter) or until a number of candidate beam detections (for example, a number of samples for the candidate beam detection) or a number of CG occasions to avoid unnecessary BWP switching.

In the case that TA is invalid, as discussed above, conventionally, the RA procedure is triggered upon time alignment timer (TAT) expiration. In some example embodiments, the RA triggering may consider both the TAT expiration and available data in a buffer at the terminal device 110. For example, when the TA is invalid, the RA may be delayed if there is data to be transmitted in a buffer of the terminal device 110. As such, upon the invalidity of the TA, the RA will be triggered when there is UL data available for transmission in the buffer. That is, the RA procedure will not be initiated immediately when a TAT expires.

The available data in the buffer may be considered together with the SSB validity. For example, if there is no valid SSB for CG-SDT, the terminal device 110 will not initiate the RA procedure until data to be transmitted arrives at the buffer.

In some example embodiments, the terminal device 110 may delay the RA procedure until receiving an instruction from the network device 120 for the RA trigger. For example, the terminal device 110 may keep on the dedicated BWP unless a PDCCH order is received from the NW side to initiate the RA procedure. The delay of the RA triggering may avoid unnecessary BWP switching and beam and/or radio link failure recovery, thereby improving the system efficiency.

Figure 4:
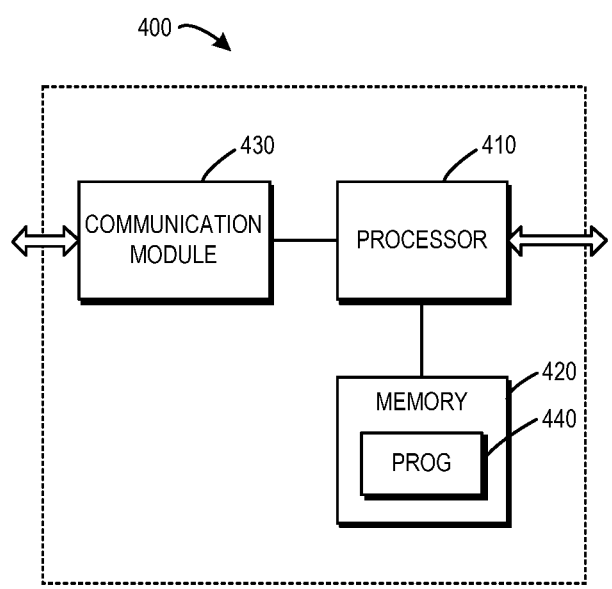
FIG. 4 illustrates a simplified block diagram of a device that is suitable for implementing example embodiments of the present disclosure.

FIG. 4 is a simplified block diagram of a device 400 that is suitable for implementing example embodiments of the present disclosure.

As shown, the device 400 includes a processor 410, a memory 420 coupled to the processor 410, a communication module 430 coupled to the processor 410, and a communication interface (not shown) coupled to the communication module 430. The memory 420 stores at least a program 440. The communication module 430 is for bidirectional communications, for example, via multiple antennas. The communication interface may represent any interface that is necessary for communication.

The program 440 is assumed to include program instructions that, when executed by the associated processor 410, enable the device 400 to operate in accordance with the example embodiments of the present disclosure, as discussed herein with reference to FIGS. 1-3. The example embodiments herein may be implemented by computer software executable by the processor 410 of the device 400, or by hardware, or by a combination of software and hardware. The processor 410 may be configured to implement various example embodiments of the present disclosure.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 420 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

When the device 400 acts as the terminal device 110, the processor 410 and the communication module 430 may cooperate to implement the methods 200 and 300 as described above with reference to FIGS. 1-3. All operations and features as described above with reference to FIGS. 1-3 are likewise applicable to the device 400 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 or 300 as described above with reference to FIGS. 1-3. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a terminal device comprises: at least one processor; and at least one memory including computer program code; the at least one memory and the computer program code configured to, with the at least one processor, cause the device to: receive, from a network device, a configuration of one or more configured grant resources for a small data transmission (SDT) procedure and a list of one or more data radio bearers (DRBs) associated with respective logical channels allowed for SDT over at least one of the one or more configured grant resources; initiate, in an inactive mode, the SDT procedure; and in accordance with a determination that a buffer status report (BSR) is triggered, determine whether a configuration of a scheduling request mask is to be applied for a logical channel configured for SDT.

In some example embodiments, the terminal device is caused to determine whether the configuration of the scheduling request mask is to be applied by: in response to determining that the BSR is triggered by a logical channel allowed for SDT over the at least one of the one or more configured grant resources, determining that the configuration of the scheduling request mask is not to be applied, or setting the scheduling request mask for a scheduling request for the logical channel configured for SDT to be true and apply the scheduling request mask.

In some example embodiments, the terminal device is caused to determine whether the configuration of the scheduling request mask is to be applied by:: in response to determining that the BSR is triggered by a logical channel disallowed for SDT over the at least one of the one or more configured grant resources, determining that the configuration of the scheduling request mask is to be applied.

In some example embodiments, the configuration of the one or more configured grant resources for the small data transmission (SDT) procedure is to be used by the terminal device in the inactive mode to initiate a connection resume attempt for the SDT.

In some aspects, a terminal device comprises: at least one processor; and at least one memory including computer program code; the at least one memory and the computer program code configured to, with the at least one processor, cause the device to: receive, from a network device, a configuration of one or more configured grant resources for a small data transmission (SDT) procedure and a list of one or more data radio bearers (DRBs) associated with respective logical channels allowed for SDT over at least one of the one or more configured grant resources; and in response to determining that a random access procedure is to be initiated, determining whether an initiation of random access procedure is to be delayed.

In some example embodiments, the terminal device is caused to determine whether the initiation of the random access procedure is to be delayed by: in response to at least one of: the SDT procedure to be initiated on a dedicated bandwidth part (BWP), invalidity of a synchronization signal block (SSB) associated with the dedicated BWP in the one or more configured grant resources on the dedicated BWP, or invalidity of a timing advance, determining that the initiation of the random access procedure is to be delayed.

In some example embodiments, the terminal device is further caused to at least one of: delaying the initiation of the random access procedure with a timer, until a number of candidate beam detections or a number of configured grant occasions, or until receiving an instruction from the network device to initiate the random access procedure.

In some example embodiments, the terminal device is further caused to: initiate the random access procedure if there is data to be transmitted in a buffer of the terminal device when timing advance expires or when there is no valid SSB.

In some example embodiments, the terminal device is caused to determine whether the initiation of the random access procedure is to be delayed by: in response to the SDT procedure to be initiated on an initial BWP, determining that the initiation of the random access procedure is not to be delayed.

In some example embodiments, the terminal device is further caused to: initiate the random access procedure based on at least one of invalidity of a SSB associated with the one or more configured grant resources on the initial BWP, or the invalidity of the timing advance.

In some aspects, a method comprises: receiving, by a terminal device, from a network device, a configuration of one or more configured grant resources for a small data transmission (SDT) procedure and a list of one or more data radio bearers (DRBs) associated with respective logical channels allowed for SDT over at least one of the one or more configured grant resources; initiating, in an inactive mode, the SDT procedure; and in accordance with a determination that a buffer status report (BSR) is triggered, determine whether a configuration of a scheduling request mask is to be applied for a logical channel configured for SDT.

In some example embodiments, determining whether the configuration of the scheduling request mask is to be applied comprises: in response to determining that the BSR is triggered by a logical channel allowed for SDT over the at least one of the one or more configured grant resources, determining that the configuration of the scheduling request mask is not to be applied, or setting the scheduling request mask for a scheduling request for the logical channel configured for SDT to be true and apply the scheduling request mask.

In some example embodiments, determining whether the configuration of the scheduling request mask is to be applied comprises: in response to determining that the BSR is triggered by a logical channel disallowed for SDT over the at least one of the one or more configured grant resources, determining that the configuration of the scheduling request mask is to be applied.

In some example embodiments, the configuration of the one or more configured grant resources for the small data transmission (SDT) procedure is to be used by the terminal device in the inactive mode to initiate a connection resume attempt for the SDT.

In some aspects, a method comprises: receiving, by a terminal device, from a network device, a configuration of one or more configured grant resources for a small data transmission (SDT) procedure and a list of one or more DRBs associated with respective logical channels allowed for SDT over the at least one of the one or more configured grant resources; and in response to determining that a random access procedure is to be initiated, determining whether an initiation of the random access procedure is to be delayed.

In some example embodiments, determining whether the initiation of the random access procedure is to be delayed comprises: in response to at least one of: the SDT procedure to be initiated on a dedicated bandwidth part (BWP), invalidity of a synchronization signal block (SSB) associated with the dedicated BWP in the one or more configured grant resources on the dedicated BWP, or invalidity of a timing advance, determining that the initiation of the random access procedure is to be delayed.

In some example embodiments, the method further comprises at least one of: delaying the initiation of the random access procedure with a timer, until a number of candidate beam detections or a number of configured grant occasions, or until receiving an instruction from the network device to initiate the random access procedure.

In some example embodiments, the method further comprises: initiating the random access procedure if there is data to be transmitted in a buffer of the terminal device when timing advance expires or when there is no valid SSB.

In some example embodiments, determining whether the initiation of the random access procedure is to be delayed comprises: in response to the SDT procedure to be initiated on an initial BWP, determining that the initiation of the random access procedure is not to be delayed.

In some example embodiments, the method further comprises: initiating the random access procedure based on at least one of invalidity of a SSB associated with the one or more configured grant resources on the initial BWP, or the invalidity of the timing advance.

In some aspects, an apparatus comprises: means for receiving, by a terminal device, from a network device, a configuration of one or more configured grant resources for a small data transmission (SDT) procedure and a list of one or more data radio bearers (DRBs) associated with respective logical channels allowed for SDT over at least one of the one or more configured grant resources; means for initiating, in an inactive mode, the SDT procedure; and means for in accordance with a determination that a buffer status report (BSR) is triggered, determine whether a configuration of a scheduling request mask is to be applied for a logical channel configured for SDT.

In some example embodiments, the means for determining whether the configuration of the scheduling request mask is to be applied comprises: means for in response to determining that the BSR is triggered by a logical channel allowed for SDT over the at least one of the one or more configured grant resources, determining that the configuration of the scheduling request mask is not to be applied, or setting the scheduling request mask for a scheduling request for the logical channel configured for SDT to be true and apply the scheduling request mask.

In some example embodiments, the means for determining whether the configuration of the scheduling request mask is to be applied comprises: means for in response to determining that the BSR is triggered by a logical channel disallowed for SDT over the at least one of the one or more configured grant resources, determining that the configuration of the scheduling request mask is to be applied.

In some example embodiments, the configuration of the one or more configured grant resources for the small data transmission (SDT) procedure is to be used by the terminal device in the inactive mode to initiate a connection resume attempt for the SDT.

In some aspects, an apparatus comprises: means for receiving, by a terminal device, from a network device, a configuration of one or more configured grant resources for a small data transmission (SDT) procedure and a list of one or more DRBs associated with respective logical channels allowed for SDT over the at least one of the one or more configured grant resources; and means for in response to determining that a random access procedure is to be initiated, determining whether an initiation of the random access procedure is to be delayed.

In some example embodiments, the means for determining whether the initiation of the random access procedure is to be delayed comprises: means for in response to at least one of: the SDT procedure to be initiated on a dedicated bandwidth part (BWP), invalidity of a synchronization signal block (SSB) associated with the dedicated BWP in the one or more configured grant resources on the dedicated BWP, or invalidity of a timing advance, determining that the initiation of the random access procedure is to be delayed.

In some example embodiments, the apparatus further comprises at least one of: means for delaying the initiation of the random access procedure with a timer, means for delaying the initiation of the random access procedure until a number of candidate beam detections or a number of configured grant occasions, or means for delaying the initiation of the random access procedure until receiving an instruction from the network device to initiate the random access procedure.

In some example embodiments, the apparatus further comprises: means for initiating the random access procedure if there is data to be transmitted in a buffer of the terminal device when timing advance expires or when there is no valid SSB.

In some example embodiments, the means for determining whether the initiation of the random access procedure is to be delayed comprises: means for in response to the SDT procedure to be initiated on an initial BWP, determining that the initiation of the random access procedure is not to be delayed.

In some example embodiments, the apparatus further comprises: means for in response to the SDT procedure to be initiated on an initial BWP, initiating the random access procedure based on at least one of invalidity of a SSB associated with the one or more configured grant resources on the initial BWP, or the invalidity of the timing advance.

In some aspects, a computer readable storage medium comprises program instructions stored thereon, the instructions, when executed by a processor of a device, causing the device to perform the method according to some example embodiments of the present disclosure.

We claim:

1. A terminal device comprising:
at least one memory storing instructions that, when executed by the at least one processor, cause the terminal device at least to:
receive, from a network device, a configuration of one or more configured grant (CG) resources for a small data transmission (SDT) procedure and a list of one or more data radio bearers (DRBs) associated with respective logical channels allowed for SDT over the at least one of the one or more configured grant resources; and
initiate a random access procedure based on whether there is available data associated with at least one of the one or more DRBs to be transmitted in a buffer of the terminal device together with whether there is valid synchronization signal block (SSB) or not.

2. The terminal device of claim 1, wherein the initiating of the random access procedure based on whether there is available data associated with at least one of the one or more DRBs to be transmitted in a buffer of the terminal device together with whether there is valid SSB or not comprises initiating the random access procedure if there is available data to be transmitted in the buffer of the terminal device when timing advance expires or when there is no valid SSB.

3. The terminal device of claim 1, wherein the terminal device is further caused to:
if there is no valid SSB associated with CG-SDT, not initiate the random access procedure until data to be transmitted arrives at the buffer of the terminal device.

4. The terminal device of claim 1, wherein whether there is valid SSB or not is determined by: when it is determined that RSRP of none of SSBs associated with CG-SDT is above a RSRP threshold, determining that there is no valid SSB for CG-SDT.

5. The terminal device of claim 1, the terminal device is further caused to: determine whether the initiation of the random access procedure is to be delayed.

6. The terminal device of claim 5, wherein the terminal device is caused to determine whether the initiation of the random access procedure is to be delayed by:
in response to at least one of:
the SDT procedure to be initiated on a dedicated bandwidth part (BWP),
invalidity of a synchronization signal block (SSB) associated with the dedicated BWP in the one or more configured grant resources on the dedicated BWP, or
invalidity of a timing advance,
determining that the initiation of the random access procedure is to be delayed.

7. The terminal device of claim 6, wherein the terminal device is further caused to at least one of: delaying the initiation of the random access procedure with a timer, until a number of candidate beam detections or a number of configured grant occasions, or until receiving an instruction from the network device to initiate the random access procedure.

8. The terminal device of claim 5, wherein the terminal device is caused to determine whether the initiation of the random access procedure is to be delayed by:
in response to the SDT procedure to be initiated on an initial BWP, determining that the initiation of the random access procedure is not to be delayed.

9. The terminal device of claim 8, wherein the terminal device is further caused to:
initiate the random access procedure based on at least one of invalidity of a SSB associated with the one or more configured grant resources on the initial BWP, or the invalidity of the timing advance.

10. A method comprising:
receiving, from a network device, a configuration of one or more configured grant (CG) resources for a small data transmission (SDT) procedure and a list of one or more data radio bearers (DRBs) associated with respective logical channels allowed for SDT over the at least one of the one or more configured grant resources; and
initiating a random access procedure based on whether there is available data associated with at least one of the one or more DRBs to be transmitted in a buffer of the terminal device together with whether there is valid synchronization signal block (SSB) or not.

11. The method of claim 10, wherein the initiating of the random access procedure based on whether there is available data associated with at least one of the one or more DRBs to be transmitted in a buffer of the terminal device together with whether there is valid SSB or not comprises initiating the random access procedure if there is available data to be transmitted in the buffer of the terminal device when timing advance expires or when there is no valid SSB.

12. The method of claim 10, further comprising:
if there is no valid SSB associated with CG-SDT, not initiate the random access procedure until data to be transmitted arrives at the buffer of the terminal device.

13. The method of claim 10, wherein whether there is valid SSB or not is determined by: when it is determined that RSRP of none of SSBs associated with CG-SDT is above a RSRP threshold, determining that there is no valid SSB for CG-SDT.

14. The method of claim 10, further comprising:
determining whether the initiation of the random access procedure is to be delayed.

15. The method of claim 14, wherein determining whether the initiation of the random access procedure is to be delayed comprises:

in response to at least one of:

the SDT procedure to be initiated on a dedicated bandwidth part (BWP), invalidity of a synchronization signal block (SSB) associated with the dedicated BWP in the one or more configured grant resources on the dedicated BWP, or invalidity of a timing advance, determining that the initiation of the random access procedure is to be delayed.

16. The method of claim 15, further comprising at least one of:

delaying the initiation of the random access procedure with a timer, until a number of candidate beam detections or a number of configured grant occasions, or until receiving an instruction from the network device to initiate the random access procedure.

17. The method of claim 14, wherein determining whether the initiation of the random access procedure is to be delayed:

in response to the SDT procedure to be initiated on an initial BWP, determining that the initiation of the random access procedure is not to be delayed.

18. The method of claim 17, wherein the terminal device is further caused to:

initiate the random access procedure based on at least one of invalidity of a SSB associated with the one or more configured grant resources on the initial BWP, or the invalidity of the timing advance.

19. A computer readable storage medium comprising program instructions stored thereon, the instructions, when executed by a processor of a device, causing the device to:

receive, from a network device, a configuration of one or more configured grant (CG) resources for a small data transmission (SDT) procedure and a list of one or more data radio bearers (DRBs) associated with respective logical channels allowed for SDT over the at least one of the one or more configured grant resources; and initiate a random access procedure based on whether there is available data associated with at least one of the one or more DRBs to be transmitted in a buffer of the terminal together with whether there is valid synchronization signal block (SSB) or not.

20. The computer readable storage medium of claim 19, wherein the initiating of the random access procedure based on whether there is available data associated with at least one of the one or more DRBs to be transmitted in a buffer of the terminal device together with whether there is valid SSB or not comprises initiating the random access procedure if there is available data to be transmitted in the buffer of the terminal device when timing advance expires or when there is no valid SSB.

* * * * *